(12) United States Patent
Mascarenas

(10) Patent No.: US 6,189,226 B1
(45) Date of Patent: Feb. 20, 2001

(54) SNOWFLAKE STENCIL

(76) Inventor: John Mascarenas, 1352 S. Coffman St. #10, Longmont, CO (US) 80501

( * ) Notice: Under 35 U.S.C. 154(b), the term of this patent shall be extended for 0 days.

(21) Appl. No.: 09/150,586

(22) Filed: Sep. 10, 1998

(51) Int. Cl.$^7$ ................................................. G09B 11/00
(52) U.S. Cl. ........................ 33/563; 434/87; D11/121
(58) Field of Search ................. 33/563, 565; D10/64; 434/85, 87; D11/117, 121, 125

(56) References Cited

U.S. PATENT DOCUMENTS

| | | | |
|---|---|---|---|
| D. 161,160 | * | 12/1950 | Burros .................................. D11/121 |
| D. 161,161 | * | 12/1950 | Burros .................................. D11/121 |
| D. 226,025 | * | 1/1973 | Singleton ............................. D10/64 |
| D. 328,724 | * | 8/1992 | Dudley ................................ D11/117 |
| D. 345,937 | * | 4/1994 | Kaneko ............................... D10/126 |
| D. 394,535 | * | 5/1998 | Villota et al. ........................ D1/126 |
| 1,595,672 | * | 8/1926 | MacDaid, Jr. ...................... D11/121 |
| 2,950,537 | * | 8/1960 | Fixen ..................................... 33/565 |
| 3,813,787 | * | 6/1974 | Mercorelli ............................. 434/87 |
| 3,861,066 | * | 1/1975 | Klaja ..................................... 434/87 |
| 4,688,330 | * | 8/1987 | Konrad .................................. 33/565 |
| 4,799,317 | * | 1/1989 | Christain et al. ..................... 33/565 |
| 4,828,497 | * | 5/1989 | Kurgan ................................. 434/87 |
| 5,100,324 | * | 3/1992 | Slayton ................................. 33/565 |
| 5,133,052 | * | 7/1992 | Bier et al. ............................ 395/155 |
| 5,484,378 | * | 1/1996 | Braithwaite ......................... 493/356 |

FOREIGN PATENT DOCUMENTS

2002132 * 10/1969 (FR) ..................................... 33/563

* cited by examiner

Primary Examiner—G. Bradley Bennett

(57) ABSTRACT

A snowflake stencil for forming a decorative snowflake image on a surface. The stencil includes a sheet having first and second faces with a plurality of decorative holes therethrough between the first and second faces of the sheet arranged to resemble the configuration of a snowflake.

1 Claim, 4 Drawing Sheets

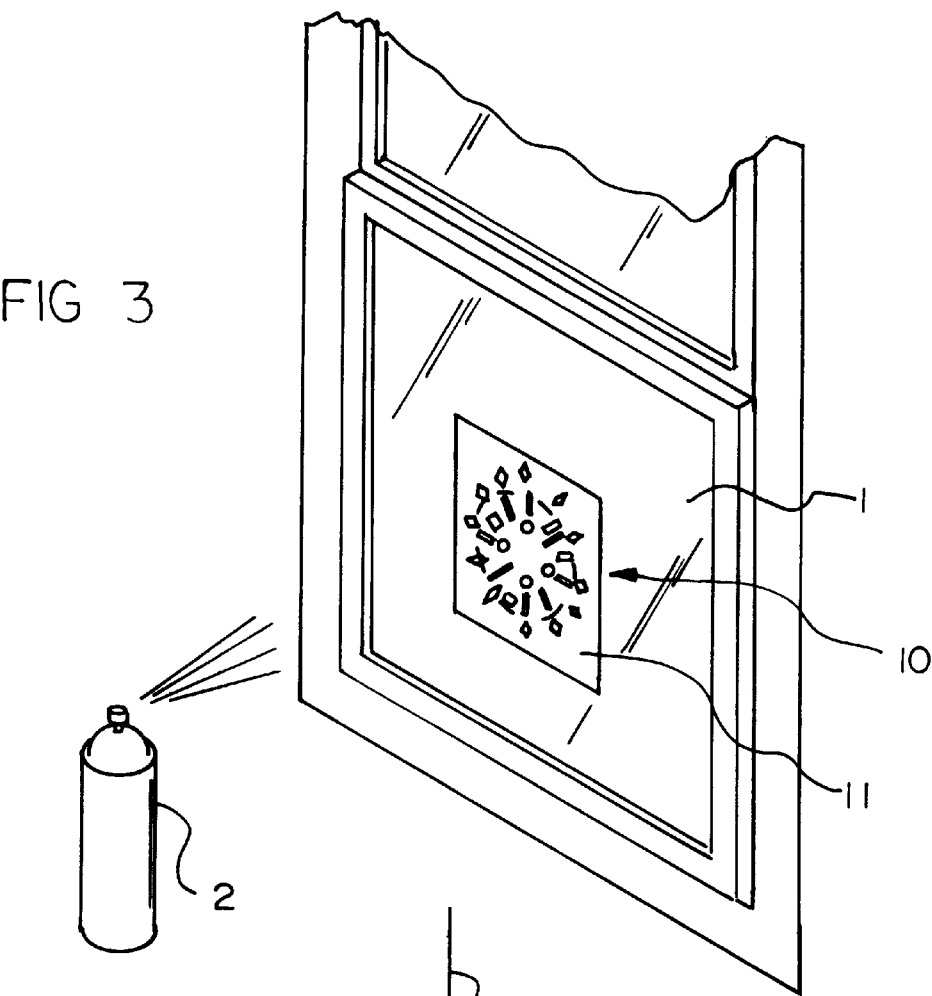
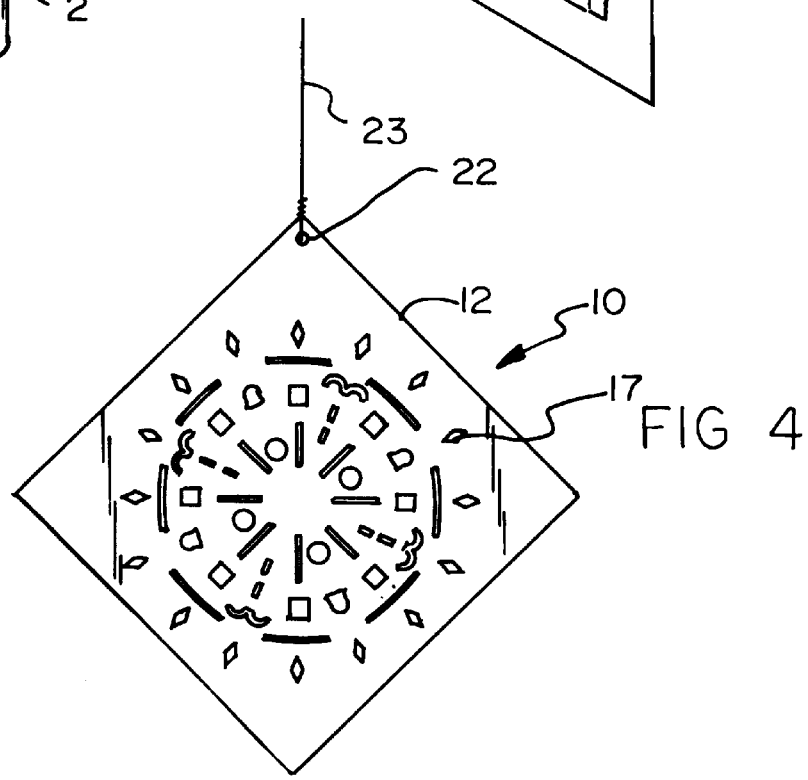

SNOWFLAKE STENCIL

BACKGROUND OF THE INVENTION

1. Field of the Invention

The present invention relates to ornamental stencils and more particularly pertains to a new snowflake stencil for forming a decorative snowflake image on a surface.

2. Description of the Prior Art

The use of ornamental stencils is known in the prior art. More specifically, ornamental stencils heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 2,080,620; 3,813,787; 2,364,529; 3,888,009; 3,900,956; and U.S. Pat. No. Des. 134,212.

While these devices fulfill their respective, particular objectives and requirements, the aforementioned patents do not disclose a new snowflake stencil. The inventive device includes a sheet having first and second faces with a plurality of decorative holes therethrough between the first and second faces of the sheet arranged to resemble the configuration of a snowflake.

In these respects, the snowflake stencil according to the present invention substantially departs from the conventional concepts and designs of the prior art, and in so doing provides an apparatus primarily developed for the purpose of forming a decorative snowflake image on a surface.

SUMMARY OF THE INVENTION

In view of the foregoing disadvantages inherent in the known types of ornamental stencils now present in the prior art, the present invention provides a new snowflake stencil construction wherein the same can be utilized for forming a decorative snowflake image on a surface.

The general purpose of the present invention, which will be described subsequently in greater detail, is to provide a new snowflake stencil apparatus and method which has many of the advantages of the ornamental stencils mentioned heretofore and many novel features that result in a new snowflake stencil which is not anticipated, rendered obvious, suggested, or even implied by any of the prior art ornamental stencils, either alone or in any combination thereof.

To attain this, the present invention generally comprises a sheet having first and second faces with a plurality of decorative holes therethrough between the first and second faces of the sheet arranged to resemble the configuration of a snowflake.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new snowflake stencil apparatus and method which has many of the advantages of the ornamental stencils mentioned heretofore and many novel features that result in a new snowflake stencil which is not anticipated, rendered obvious, suggested, or even implied by any of the prior art ornamental stencils, either alone or in any combination thereof.

It is another object of the present invention to provide a new snowflake stencil which may be easily and efficiently manufactured and marketed.

It is a further object of the present invention to provide a new snowflake stencil which is of a durable and reliable construction.

An even further object of the present invention is to provide a new snowflake stencil which is susceptible of a low cost of manufacture with regard to both materials and labor, and which accordingly is then susceptible of low prices of sale to the consuming public, thereby making such snowflake stencil economically available to the buying public.

Still yet another object of the present invention is to provide a new snowflake stencil which provides in the apparatuses and methods of the prior art some of the advantages thereof, while simultaneously overcoming some of the disadvantages normally associated therewith.

Still another object of the present invention is to provide a new snowflake stencil for forming a decorative snowflake image on a surface.

Yet another object of the present invention is to provide a new snowflake stencil which includes a sheet having first and second faces with a plurality of decorative holes therethrough between the first and second faces of the sheet arranged to resemble the configuration of a snowflake.

Still yet another object of the present invention is to provide a new snowflake stencil on which aerosol artificial snow may be sprayed on to leave a decorative snowflake image on a surface.

Even still another object of the present invention is to provide a new snowflake stencil that may also be suspended from an object by a string to function as a decorative ornament.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic perspective view of the present invention in use as a stencil.

FIG. 4 is a schematic side view of the present invention in use as an ornament.

DESCRIPTION OF THE PREFERRED EMBODIMENT

Figure 1:
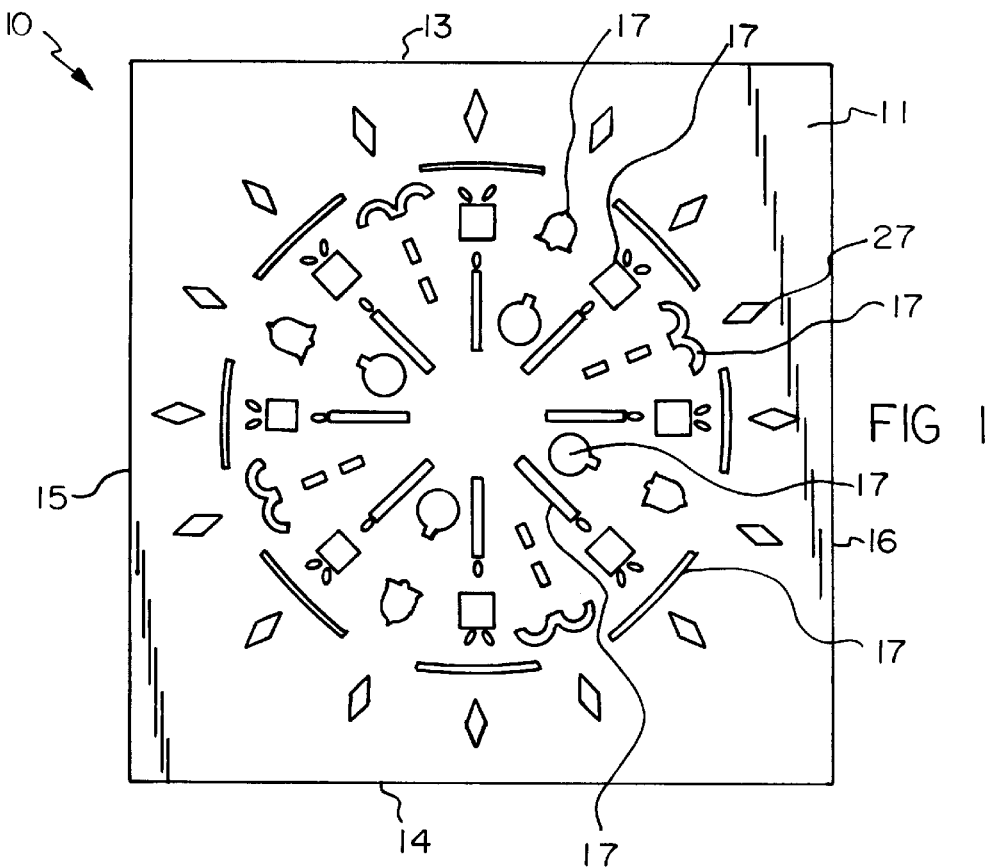
FIG. 1 is a schematic plan view of a new snowflake stencil according to the present invention.
Figure 2:
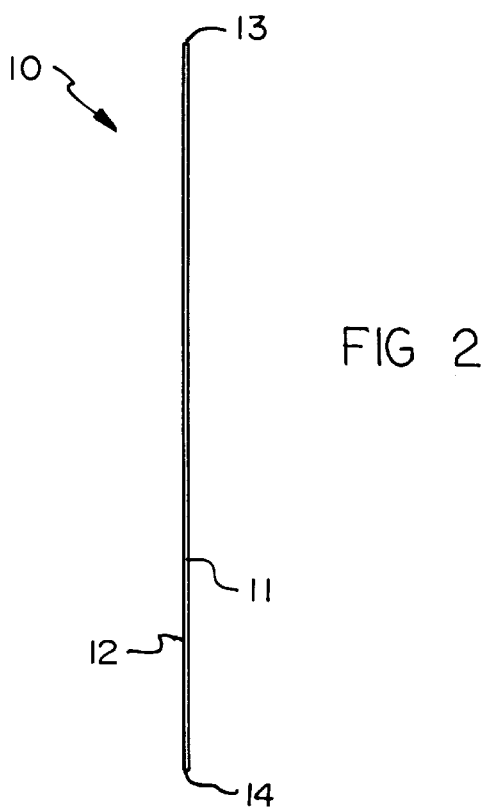
FIG. 2 is a schematic side view of the present invention.

With reference now to the drawings, and in particular to FIGS. 1 through 8 thereof, a new snowflake stencil embodying the principles and concepts of the present invention will be described.

As best illustrated in FIGS. 1 through 8, the snowflake stencil generally comprises a sheet 10 having first and second faces 11,12 with a plurality of decorative holes 17 therethrough between the first and second faces 11,12 of the sheet 10 arranged to resemble the configuration of a snowflake.

In closer detail, as illustrated in FIG. 3, the stencil is primarily designed for forming a decorative snowflake image on a surface 1. Specifically, the sheet 10 is generally rectangular and has a center, first and second faces 11,12, and a plurality of generally straight side edges 13,14,15,16. In use, the sheet 10 is designed for placing the first face 11 of the sheet 10 against a surface 1 and applying an aerosol artificial snow 2 and also paint and ink on the second face 12 of the sheet 10 as illustrated in FIG. 3.

The plurality of side edges of the sheet 10 include a spaced apart first pair of side edges 13,14 and a spaced apart second pair of side edges 15,16 extending between the first pair of side edges 13,14. The side edges of the first pair of side edges 13,14 extending generally parallel to one another. The side edges of the second pair of side edges 15,16 extending generally parallel to one another and generally perpendicular to the side edges of the first pair of side edges 13,14. The sheet 10 has a length defined between the first pair of side edges 13,14 and a width defined between the second pair of side edges 15,16. Preferably, the length of the sheet 10 is greater than about 5 inches and the width of the sheet 10 is greater than about 4 inches. Ideally, the length of the sheet 10 is about 10 inches and the width of the sheet 10 is about 8 inches.

The sheet 10 has a plurality of decorative holes 17 therethrough between the first and second faces 11,12 of the sheet 10. In use as illustrated in FIG. 3, the decorative holes 17 are designed for permitting application of the aerosol artificial snow 2 on the first face 11 of the sheet 10 through the sheet 10 on to the surface 1 to leave a decorative snowflake image on the surface 1. The decorative holes 17 of the sheet 10 are arranged on the sheet 10 preferably along line radiating from the center of the sheet 10 to resemble the configuration of a snowflake through the sheet 10. Each of the decorative holes 17 of the sheet 10 has a periphery configured to a decorative shape. Preferably as illustrated in FIG. 1, the peripheries of a number of the decorative holes 17 are configured to resemble seasonal shapes including bells, Christmas presents, candles, Christmas ornaments, and even Christmas trees.

Figure 6:
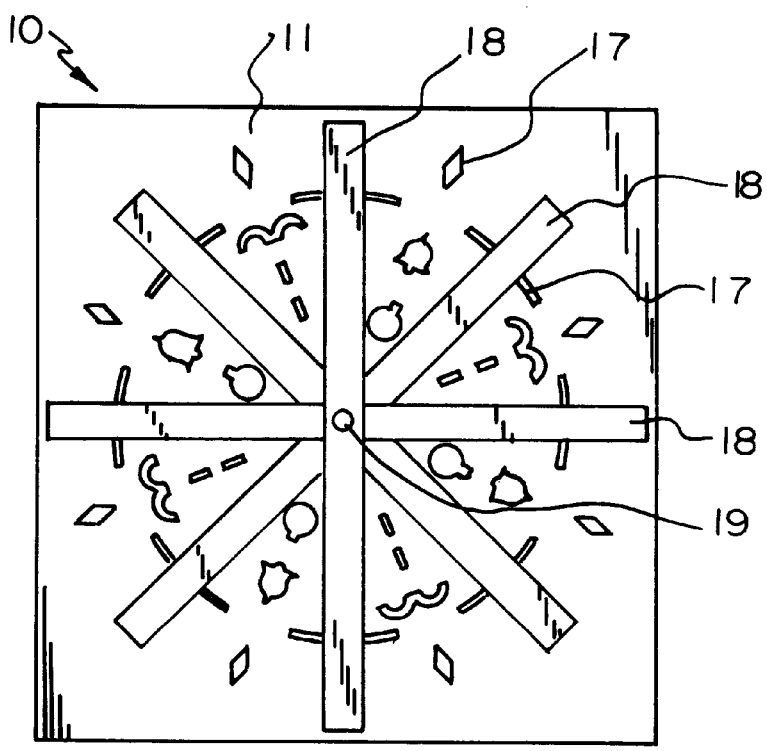
FIG. 6 is a schematic plan view of the present invention with several cover strips.

Optionally, as illustrated in FIG. 6, at least one elongate cover strip 18 may be provided on the first face 11 of the sheet 10. Each cover strip 18 is generally rectangular and has a pair of opposite ends. Each cover strip 18 is pivotally coupled to the center of first face 11 of the sheet 10 at a midpoint 19 between the ends of the cover strip 18 to permit free rotation of the cover strip 18 on first face 11 of the sheet 10. In use, each cover strip 18 is designed for covering some of the decorative holes 17 and portions of some of the decorative holes 17 to vary the design of the decorative snowflake image formed by the sheet 10.

Figure 5:
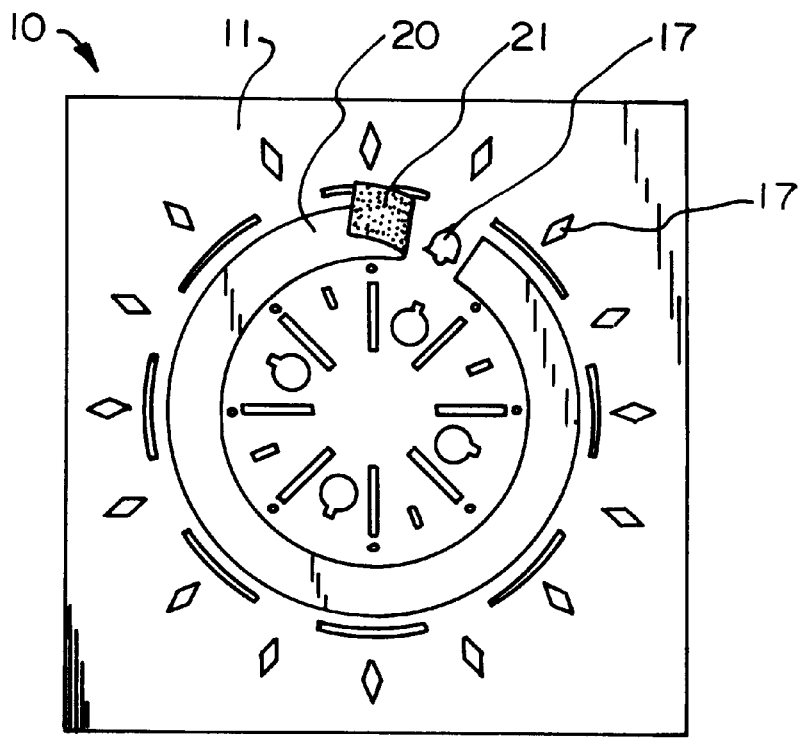
FIG. 5 is a schematic plan view of the present invention with an adhesive overlay.

Also optionally, with reference to FIG. 5, an adhesive overlay 20 having an adhesive 21 on one side may be provided for adhesive attachment on one of the faces of the sheet 10 such that the adhesive overlay 20 covers some of the decorative holes 17 of the sheet 10 or portions thereof to vary the design of the decorative snowflake image formed by the sheet 10. Ideally, the adhesive overlay 20 is generally a circular ring shape with a break therethrough.

Preferably as shown in FIG. 4, the sheet 10 may include a generally circular aperture 22 therethrough between the first and second faces 11,12 of the sheet 10. The aperture 22 of the sheet 10 is preferably positioned adjacent one of the corners of the sheet 10 so that the sheet 10 may be suspended the sheet 10 (for example by a string 23) from an object such as a Christmas tree to permit use of the sheet 10 as a decorative ornament.

Figure 7:
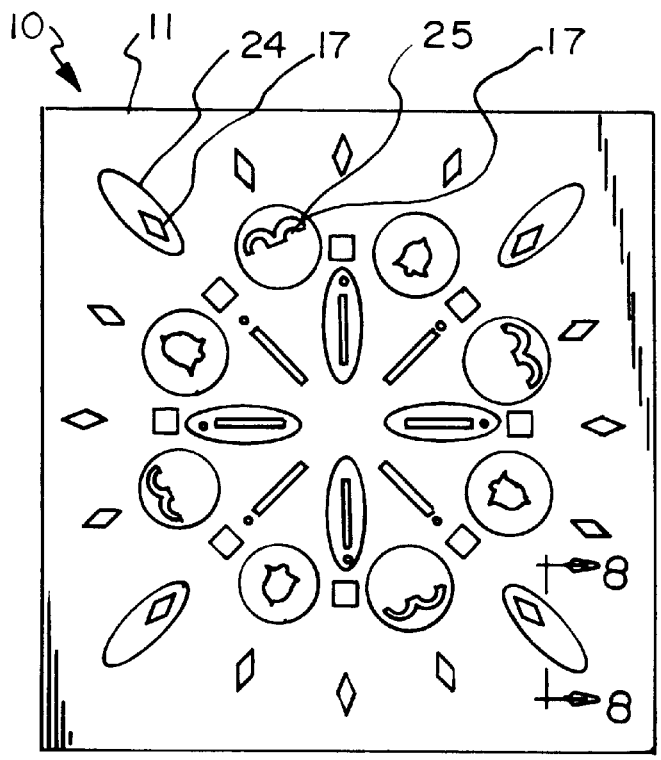
FIG. 7 is a schematic plan view an embodiment of the present invention having several separable portions in both circular and oval shapes.
Figure 8:
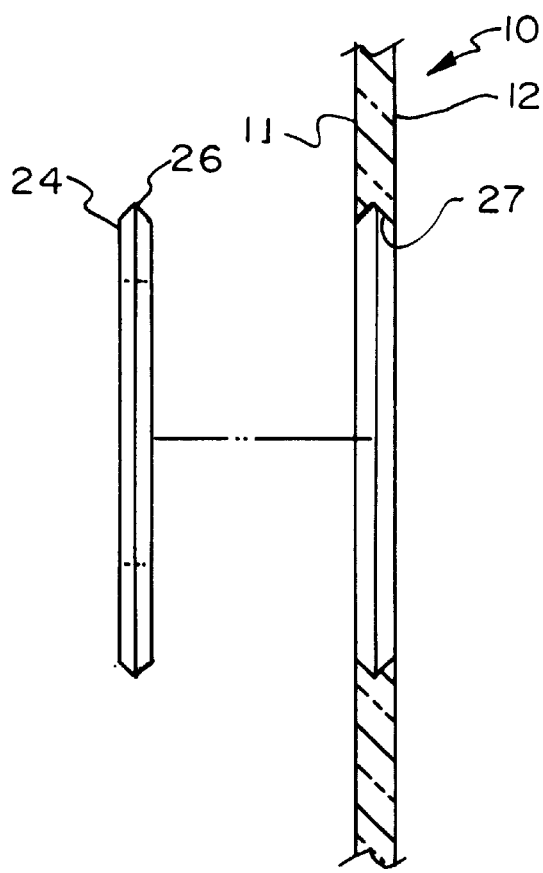
FIG. 8 is a schematic cross sectional view of a separable portion embodiment of the present invention taken from line 8—8 on FIG. 7.

With reference to FIGS. 7 and 8, in an ideal optional embodiment, the sheet 10 has a plurality of separable portions 24,25 each being detachable and reattachable to the sheet 10. Each of the separable portions 24,25 of the sheet 10 has a least one of the decorative holes 17 of the sheet 10 located thereon. In use, the separable portions 24,25 are interchangeably insertable into similarly shaped portion holes so that the locations of some of the decorative holes 17 may be rearranged on the sheet 10 by a user to vary the snowflake image formed by the sheet. Each of the separable portions 24,25 forms a portion hole through the first and second faces 11,12 of the sheet 10. As illustrated in FIG. 8, each of the separable portions 24,25 has an V-shaped outer perimeter 26 and each of the portion holes of the sheet 10 has a V-shaped periphery 27 corresponding to the shape of the separable portion which formed the portion hole. In use, the outer perimeter 26 of a separable portion snaps into the periphery 27 of a portion hole to attach the separable portion to the sheet 10 when the separable portion is inserted to the portion hole.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A stencil, comprising:

a sheet being generally rectangular and having a center, first and second faces, and a plurality of generally straight side edges;

said sheet being adapted for placing said first face of said sheet against a surface and applying an aerosol artificial snow on said second face of said sheet;

said plurality of side edges of said sheet including a spaced apart first pair of side edges and a spaced apart second pair of side edges extending between said first pair of side edges;

the side edges of said first pair of side edges extending generally parallel to one another, the side edges of said second pair of side edges extending generally parallel to one another and generally perpendicular to the side edges of said first pair of side edges;

said sheet having a length defined between said first pair of side edges and a width defined between said second pair of side edges, wherein said length of said sheet is greater than about 5 inches and said width of said sheet is greater than about 4 inches, wherein said length of said sheet is about 10 inches and said width of said sheet is about 8 inches;

said sheet having a plurality of decorative holes therethrough between said first and second faces of said sheet, said decorative holes being adapted for permitting application of the aerosol artificial snow on said second face of said sheet through said sheet and on to the surface, said decorative holes of said sheet being arranged on said sheet to resemble the configuration of a snowflake, each decorative hole having an axis of symmetry, the axes of symmetry of the decorative holes intersecting at a common point on said sheet;

each of said decorative holes of said sheet having a periphery, wherein said peripheries of a number of said decorative holes are configured to resemble seasonal shapes including bells, Christmas presents, candles, and Christmas ornaments;

an elongate cover strip being provided on said first face of said sheet, said cover strip being generally rectangular and having a pair of opposite ends, said cover strip being pivotally coupled to said center of said sheet at a midpoint between said ends of said cover strip to permit free rotation of said cover strip on first face of said sheet said cover strip being for covering some of said decorative holes and portions of some of said decorative holes to vary the configuration of the snowflake formed by said sheet;

an adhesive overlay being provided for adhesive attachment on one of said faces of said sheet such that said adhesive overlay covers some of said decorative holes of said sheet, wherein said adhesive overlay is generally a circular ring shape and has a break therethrough;

said sheet having a plurality of corners, said sheet having a generally circular aperture therethrough between said first and second faces of said sheet, said aperture of said sheet being positioned adjacent one of said corners of said sheet, said aperture of said sheet being adapted for suspending said sheet from an object;

said sheet having a plurality of separable portions each being detachable and attachable to said sheet, each of said separable portions of said sheet having a least one of said decorative holes of said sheet located thereon, said separable portions being interchangeably insertable into said portion holes such that the locations of some of said decorative holes may be rearranged on said sheet by a user; and each of said separable portions forming a portion hole through said first and second faces of said sheet, each of said separable portions having an V-shaped outer perimeter, each of said portion holes of said sheet having a V-shaped periphery corresponding to said V-shaped periphery of said separable portion, the outer perimeter of a separable portion engaging the periphery of a portion hole to attach the separable portion to said sheet when the separable portion is inserted to the portion hole.

* * * * *